(12) United States Patent
Huang

(10) Patent No.: US 7,318,375 B2
(45) Date of Patent: Jan. 15, 2008

(54) FOOD STIRRER

(76) Inventor: Ching-Chi Huang, 2F, No. 191, Sinsiao Rd., Tainan City (TW)

( * ) Notice: Subject to any disclaimer, the term of this patent is extended or adjusted under 35 U.S.C. 154(b) by 0 days.

(21) Appl. No.: 11/315,315

(22) Filed: Dec. 23, 2005

(65) Prior Publication Data

US 2007/0144358 A1    Jun. 28, 2007

(51) Int. Cl.
*A23L 1/00* (2006.01)

(52) U.S. Cl. .................. 99/348; 366/205; 366/314

(58) Field of Classification Search .................. 99/348, 99/349, 327–333, 485; 366/279, 314, 205, 366/206; 241/37.5, 92
See application file for complete search history.

(56) References Cited

U.S. PATENT DOCUMENTS

| | | | | |
|---|---|---|---|---|
| 3,612,126 | A * | 10/1971 | Emmons et al. | 241/199.12 |
| 5,297,475 | A * | 3/1994 | Borger et al. | 99/348 |
| 5,338,111 | A * | 8/1994 | Trocherie et al. | 366/205 |
| 6,012,837 | A * | 1/2000 | Thuma | 366/294 |
| 6,164,196 | A * | 12/2000 | Deschamps et al. | 99/513 |
| 6,350,053 | B1 * | 2/2002 | Morin | 366/205 |
| 6,523,993 | B2 * | 2/2003 | Williams et al. | 366/197 |
| 6,527,433 | B2 * | 3/2003 | Daniels, Jr. | 366/205 |
| 6,595,121 | B1 * | 7/2003 | Chang Chien | 99/510 |
| 6,616,324 | B1 * | 9/2003 | Planca et al. | 366/205 |
| 6,837,153 | B1 * | 1/2005 | Chang Chien | 99/510 |
| 6,907,819 | B2 * | 6/2005 | Kernan | 99/492 |
| 6,910,800 | B2 * | 6/2005 | Wu | 366/199 |
| 6,960,015 | B2 * | 11/2005 | Lee | 366/205 |

* cited by examiner

*Primary Examiner*—Timothy F. Simone
(74) *Attorney, Agent, or Firm*—Bacon & Thomas, PLLC

(57) ABSTRACT

A food stirrer includes a seat and a container. A driving axle extends through the seat. A bushing is provided outside the driving axle. The driving axle has a brake device for quickly stopping the rotation of the driving axle when a motor is powered off. A spring is provided under an upper sleeve and received in the middle sleeve with a tendency to push the upper sleeve upwards. A first one-way ratchet wheel is mounted at a bottom end of the driving axle. A gear assembly is mounted beneath a bottom end of the driving axle, and connected to the motor by a connector. A second one-way ratchet wheel is engaged with the first one-way ratchet wheel. The container has a cover, a pole formed on the cover for pushing the driving axle downwards, and a cutting tool provided outside the bushing and formed with multiple blades.

8 Claims, 8 Drawing Sheets

FOOD STIRRER

BACKGROUND OF THE INVENTION

1. Field of the Invention

The present invention relates to a food stirrer, and more particularly to a food stirrer with a transmission device that can quickly stop a driving axle.

2. Description of Related Art

A conventional food stirrer generally includes a base and a container. The base has a motor installed therein and a seat formed thereon. A connector for connecting an output axle of the motor is formed at a central portion of the seat. A cutting tool is installed in the container. A sleeve is provided at the bottom of the container and a transmission device is received in the sleeve. The transmission device has a driving axle to turn the cutting tool. When the sleeve is installed on the seat, the connector is engaged with a joint at a bottom end of the transmission device. When the motor is powered on, the driving axle is driven to rotate the cutting tool for stirring food, vegetable or fruit.

However, when the motor is powered off, the driving axle can not stop immediately and only can be gradually slow down. If a user carelessly put his hand in the container, his hand may be injured by the rotating cutting tool. Therefore, the conventional food stirrer has a low safety.

Therefore, the invention provides a food stirrer to mitigate or obviate the aforementioned problems.

SUMMARY OF THE INVENTION

The main objective of the present invention is to provide a food stirrer which has a brake device for quickly stopping a driving axle when a cover is removed from a container of the food stirrer.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
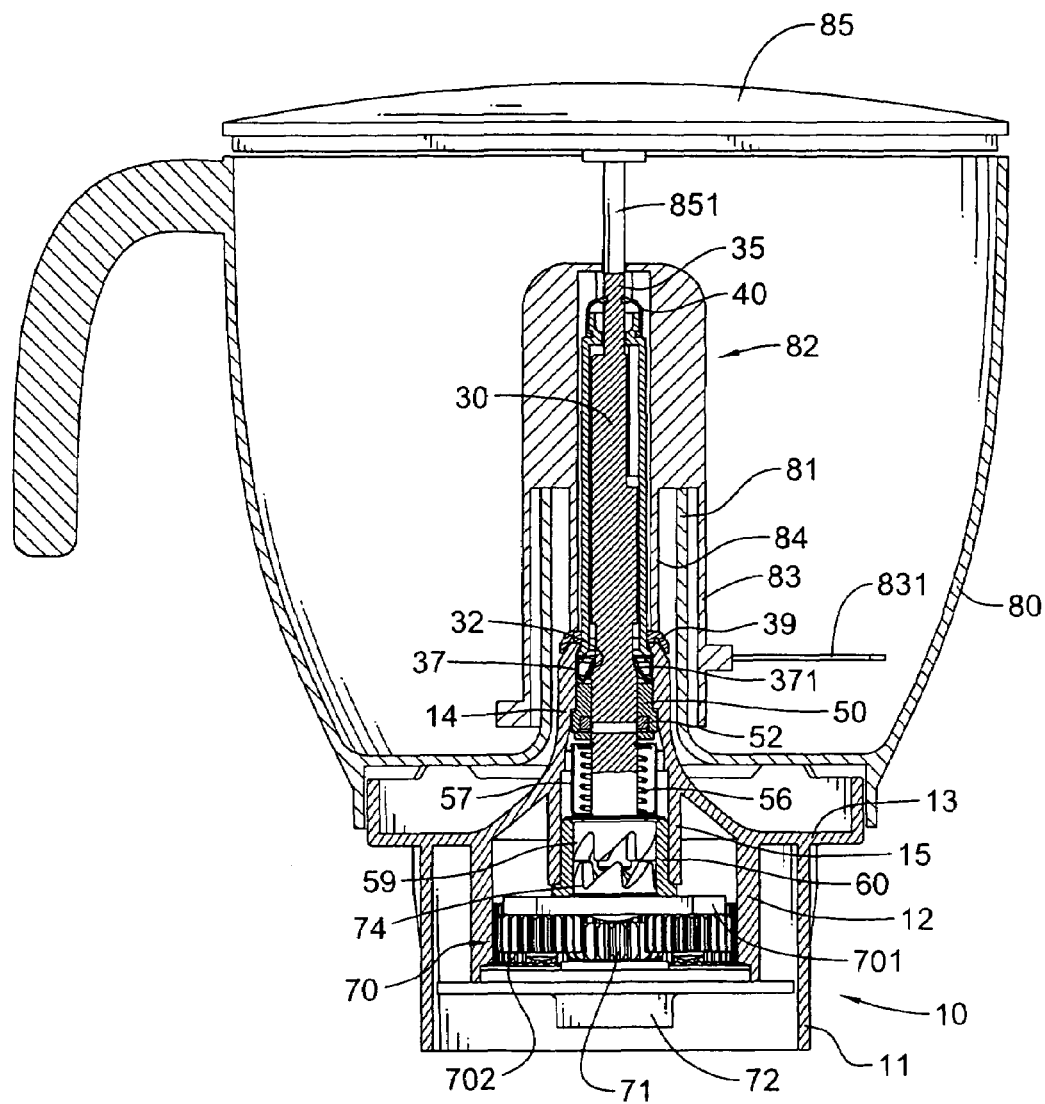
FIG. 1 is a front view in partial cross section of a food stirrer being in the present invention showing that the food stirrer is not completely covered with a cover.
Figure 2:
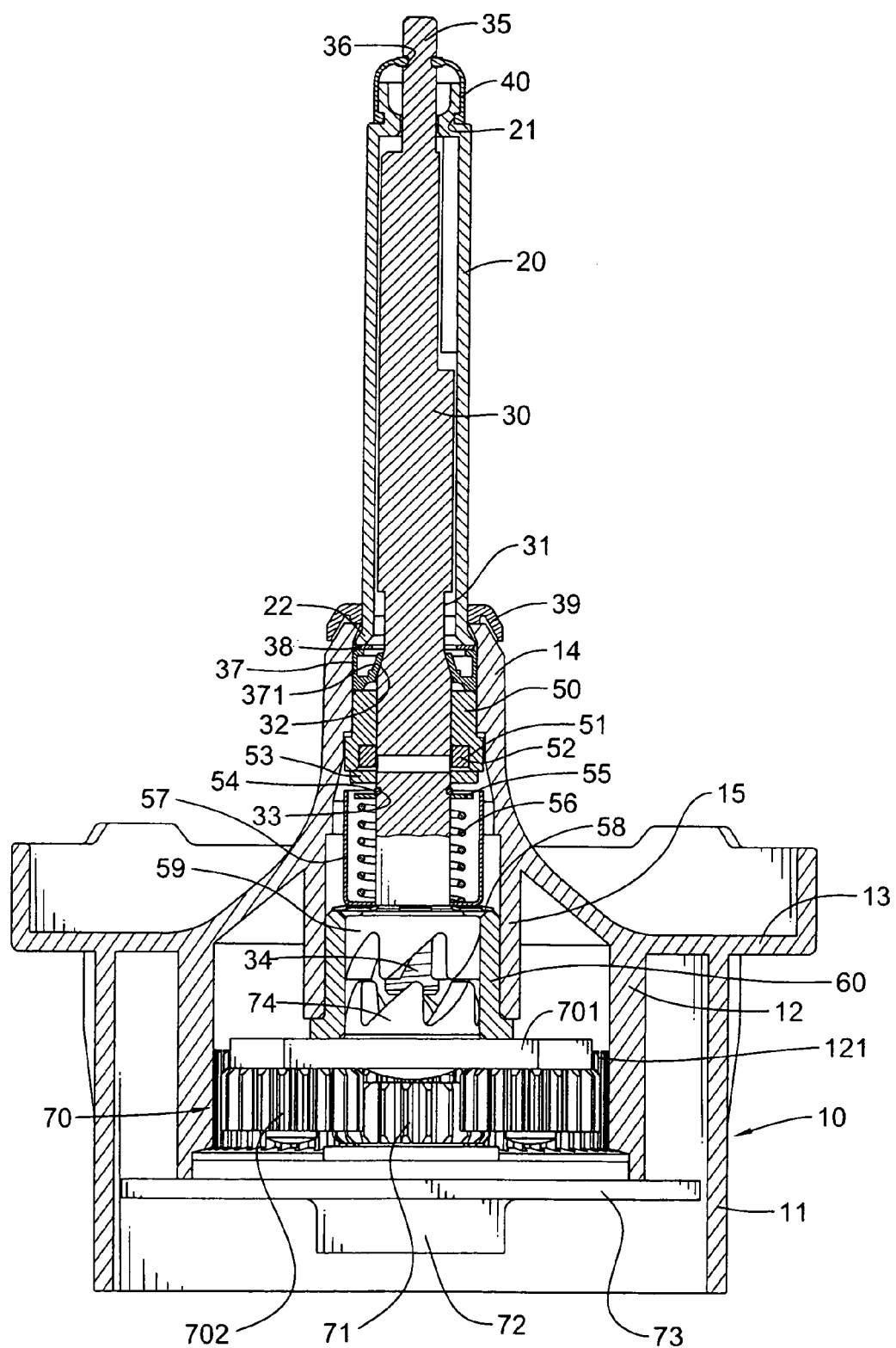
FIG. 2 is a front view in partial cross section of a transmission device of the food stirrer in FIG. 1.
Figure 3:
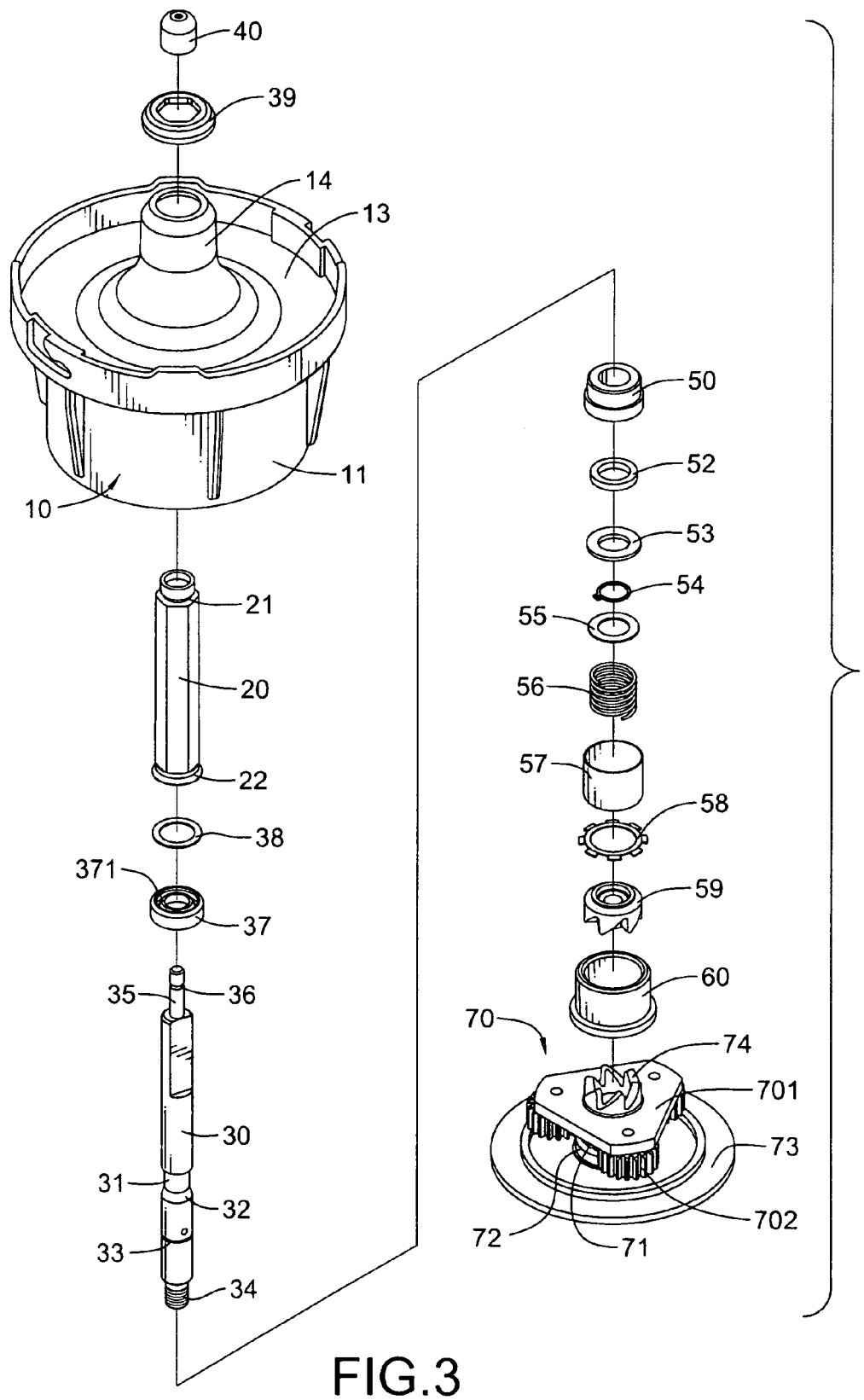
FIG. 3 is an exploded perspective view of the transmission device of the food stirrer in FIG. 2.

With reference to FIGS. 1-3, a food stirrer in accordance with the present invention has a seat (10), and a container (80) provided on the seat (10). The seat (10) is mounted on a base, and a motor is installed in the base for driving a cutting tool (82) in the container (80).

The seat (10) has a board (13) for supporting the container (80). A lower tube (15) is integrally formed in the board (13) and extends downwards, and an upper tube (14) is communicated with the lower tube (15) and extends upwards. The seat (10) further includes an exterior barrel (11) and an interior barrel (12) formed at a bottom side of the board (13).

A transmission device is provided in the lower tube (15) and upper tube (14). The transmission device includes a driving axle (30) extending through the upper tube (14). A bushing (20) is provided outside an upper end of the driving axle (30), and a gear assembly (70) is provided at a lower end of the driving axle (30).

The driving axle (30) has an annular recess (31) defined at a middle portion thereof. A coned portion (32) is formed beneath the annular recess (31). A seal (37) is positioned in the upper tube (14) and provided outside the annular recess (31). A stopping ring (371) is formed in the seal (37) with a coned inner wall. The coned portion (32) and the coned inner wall each have an upper diameter smaller than a lower diameter.

The driving axle (30) further has a first ring slot (33) beneath the annular recess (31) and a threaded joint (34) formed at a bottom end thereof. A pin (35) is formed at a top end of the driving axle (30), and a second annular slot (36) is peripherally defined on the pin (36).

The bushing (20) with a polygonal cross section extends out from the upper tube (14). A flange (22) is formed at a bottom end of the bushing (20) to prevent the bushing (20) from escaping from the upper tube (14). The seal (37) is provided under the flange (22), and a first washer (38) is provided between the seal (37) and the flange (22). A cuff (39) is provided at a top end of the upper tube (14) and outside the bushing (20) for further positioning the bushing (20). A third annular slot (21) is defined at a top end of the bushing (20).

The pin (35) extends out from the top end of the bushing (20) and through an elastic cap (40) on the top end of the bushing (20). The cap (40) has a lower edge positioned in the third annular slot (21) and an upper edge positioned in the second slot (36).

An upper sleeve (50) is provided between the upper tube (14) and the driving axle (30) and under the seal (37). A counter bore (51) is defined at a bottom of the upper sleeve (50), and a magnet ring (52) is received in the counter bore (51). A magnetizable metal ring (53) is provided under the magnet ring (52) and can be magnetically attracted by the magnet ring (52).

A spring (56) is provided on the driving axle (30) and beneath the magnetizable metal ring (53). A collar (54) and a second washer (55) are in turn provided between the magnetizable metal ring (53) and the spring (56), wherein the collar (54) is positioned in the first ring slot (33).

A middle sleeve (57) is provided outside the spring (56). A first one-way ratchet wheel (59) is screwed onto the threaded joint (34). An elastic ring (58) is provided between the middle sleeve (57) and the first one-way ratchet wheel (59). A lower sleeve (60) is mounted in the lower tube (15), and the first one-way ratchet wheel (59) is received in the lower sleeve (60).

The gear assembly (70) is mounted in the interior barrel (12). An internal gear (121) is formed on an inner wall of the interior barrel (12). The gear assembly (70) has a bottom plate (73) and an upper plate (701). A connector (72) is formed under the bottom plate (73). A second one-way ratchet wheel (74) is formed on the upper plate (701). A driving gear (71) is connected to the connector (72). Multiple planet gears (702) are provided around the driving gear (71) and engaged between the driving gear (71) and the internal gear (121). An output axle of the motor can be connected to the connector (72) to drive the gear assembly (70).

Figure 4:
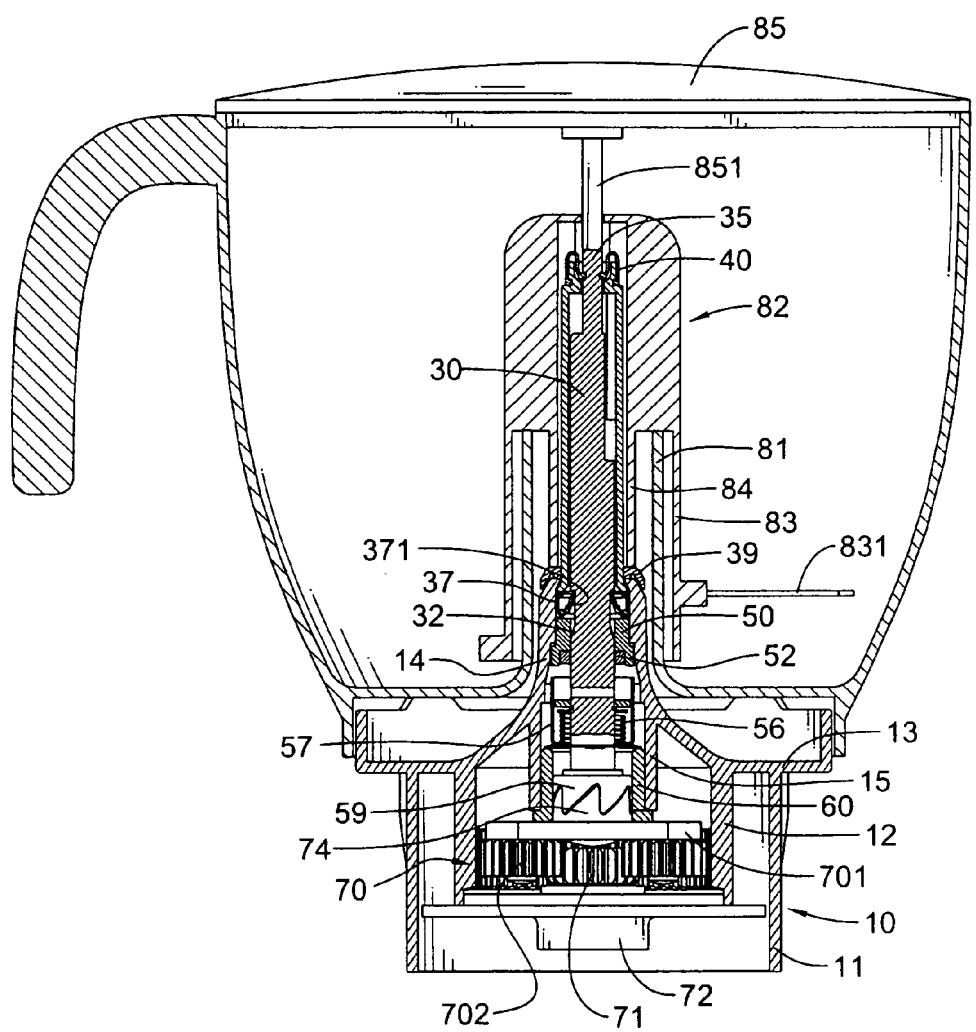
FIG. 4 is an operational front view in partial cross section of the food stirrer in FIG. 1 showing that the food stirrer is completely covered with the cover.

The container (80) has a cover (85) with a pole (851). When the cover (85) is put on the container (80), the pole (851) pushes the driving axle (30) downwards about the bushing (20) to engage the first one-way ratchet wheel (59) with the second one-way ratchet wheel (74), as shown in FIG. 4. At the same time, the spring (56) is compressed, and the magnetizable metal ring (53) is moved away from the magnet ring (52).

The cutting tool (82) is provided outside the bushing (20). The cutting tool (82) has an interior tube (84) with a polygonal cross section corresponding to that of the bushing (20), and an exterior tube (83) formed with multiple blades (831).

Figure 5:
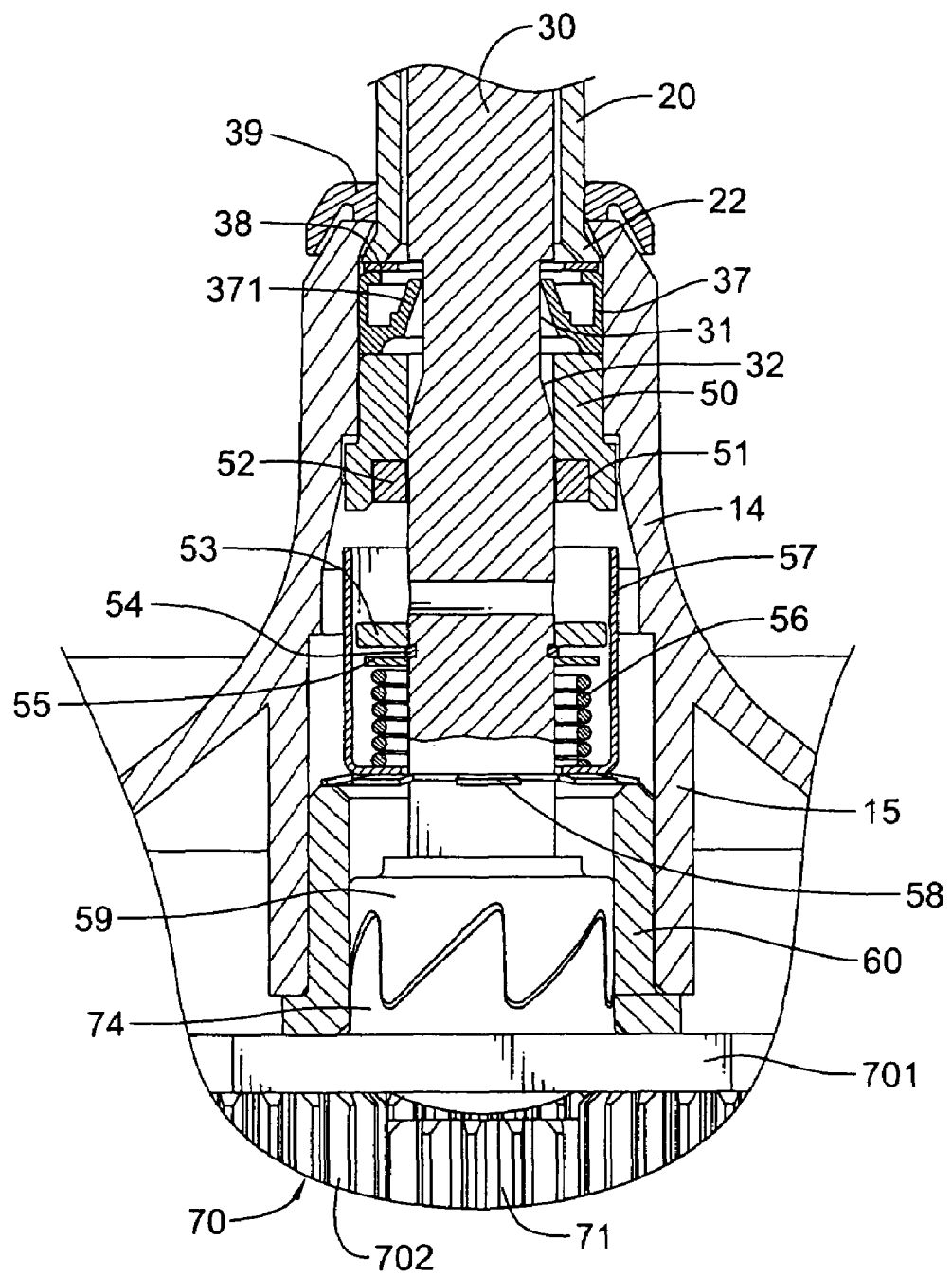
FIG. 5 is an enlarged partial front view in partial cross section of the transmission device in FIG. 4.

With reference to FIGS. 4-5, in a case that the driving axle (30) is pushed by the pole (851) to engage the first one-way ratchet wheel (59) with the second one-way ratchet wheel (74), when the motor is powered on, the driving gear (71) is turned to rotate the cutting tool (82) to stir food, vegetable or fruit in the container (80).

Figure 6:
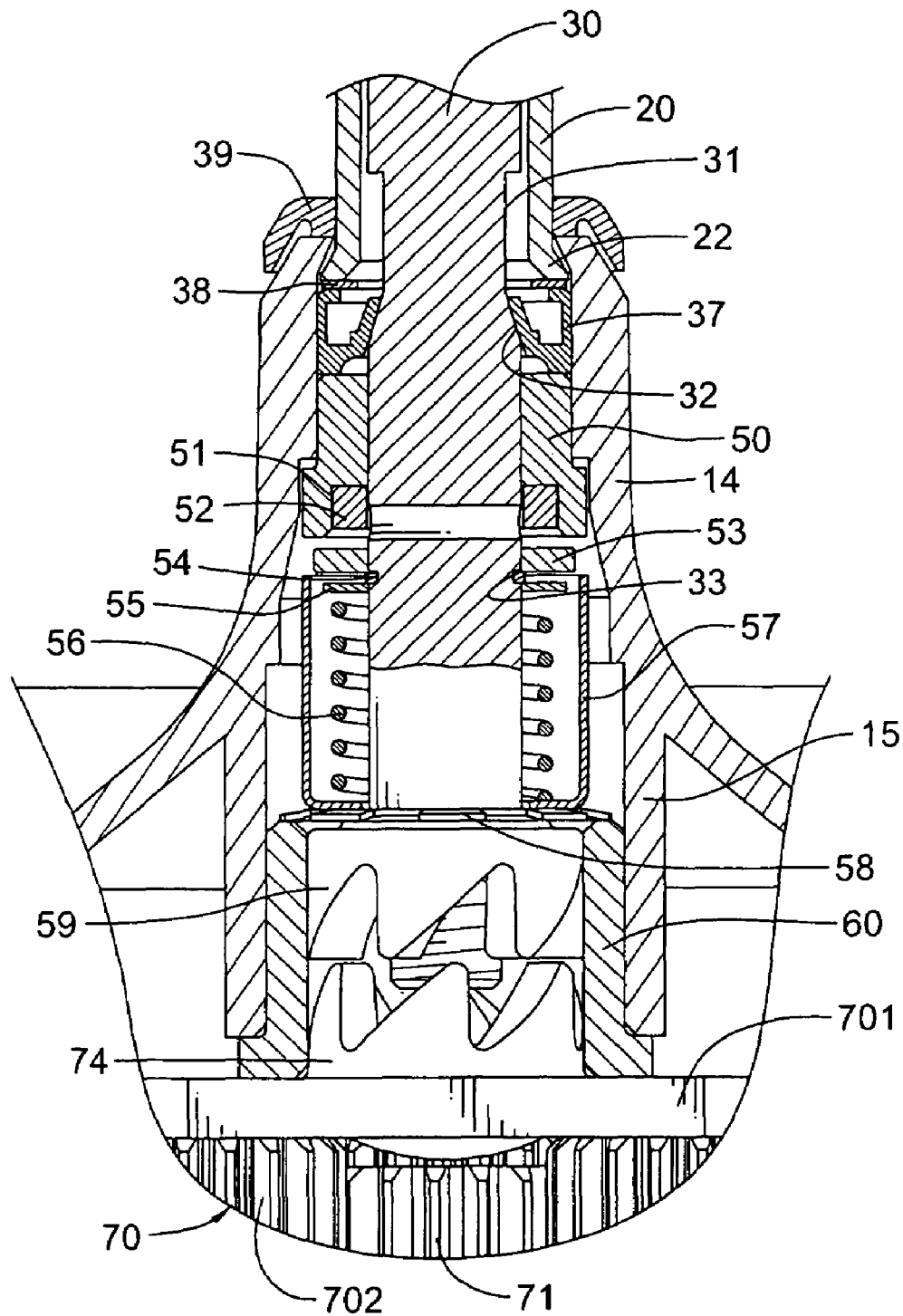
FIG. 6 is an operational enlarged front view in partial cross section of the food stirrer in FIG. 4 when the cover is removed.

With reference to FIG. 6, after the stirring process is completed and the motor is powered off, when the cover (85) is removed, the driving axle (30) is pushed upwards under the force of the spring (56) to disengage the first one-way ratchet wheel (59) from the second one-way ratchet wheel (74). At the same time, the coned portion (32) of the driving axle (30) is in contact with the stopping ring (371), so the driving axle (30) is quickly braked by the friction between the stopping ring (371) and the coned portion (32).

During the upward movement of the driving axle (30), the magnetizable ring (53) can be attracted by the magnet ring (52) to provide an assistant force to move the driving axle (30) more quickly. Therefore, the driving axle (30) can be in contact with the stopping ring (371) immediately, and will be stopped soon.

Figure 7:
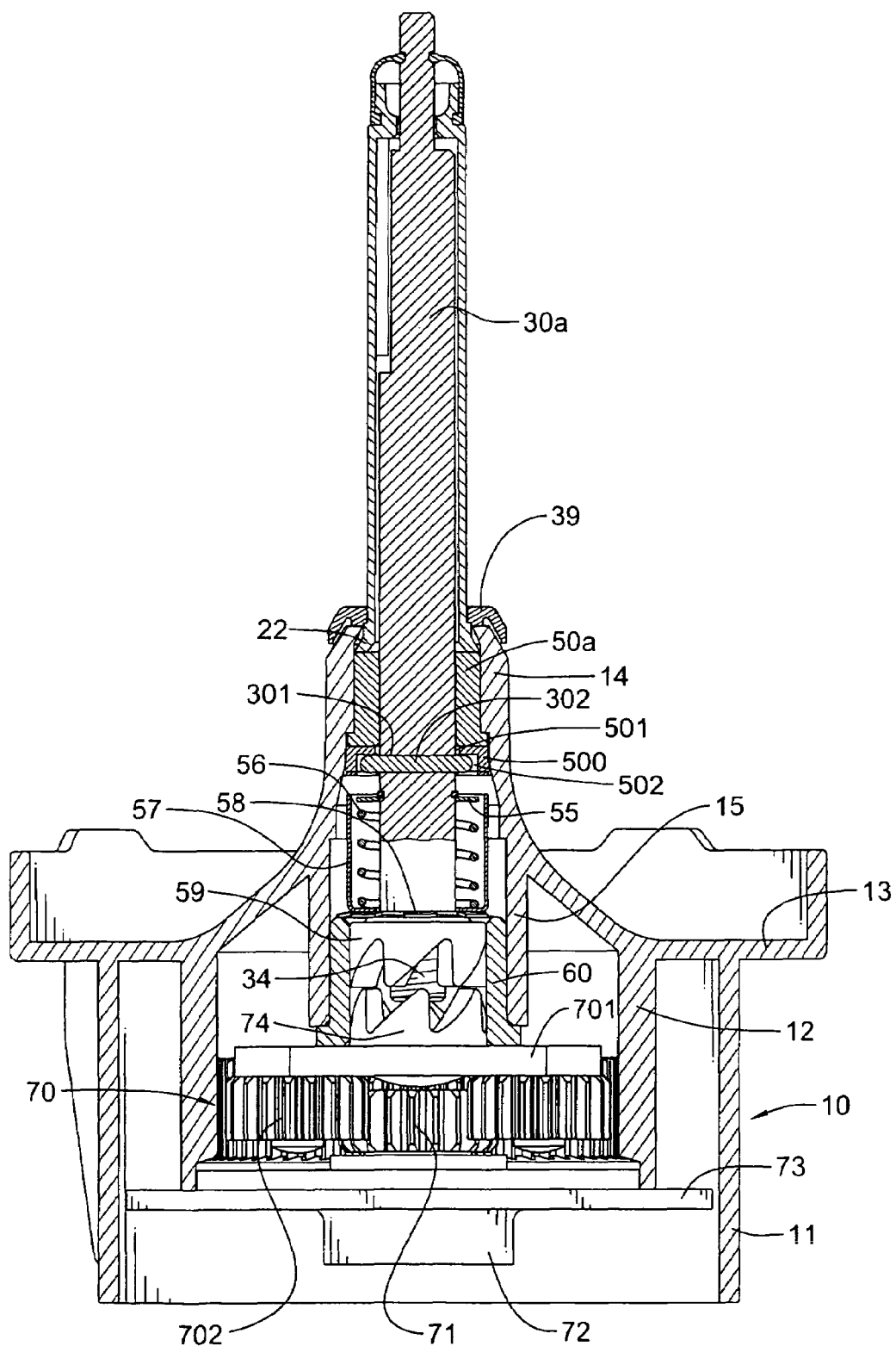
FIG. 7 is a front view in partial cross section of another embodiment of a food stirrer in accordance with the present invention.
Figure 8:
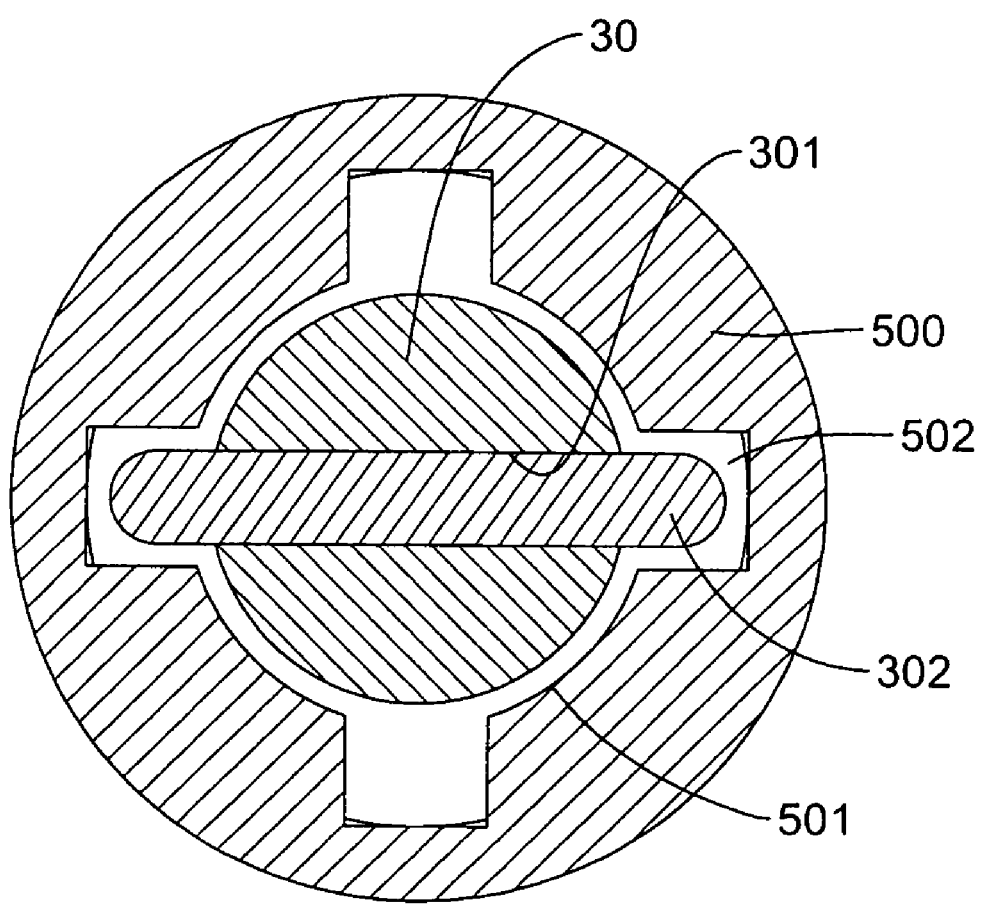
FIG. 8 is a top sectional view of the food stirrer in FIG. 7.

In another embodiment as illustrated in FIGS. 7-8, the upper tube (14) of the seat (10) is provided with an upper sleeve (50a). A driving axle (30a) extends through the upper sleeve (50a). The driving axle (30a) has a hole (301) radially defined therethrough and a stop pin (302) extending through the hole (301). A stopping ring (500) is provided beneath the upper sleeve (50a), and has an opening (501) for the driving axle (30a) extending therethrough. Multiple stop slots (502) are radially defined in the stopping ring (500) for receiving the stop pin (302).

In this embodiment, the seal (37) and the annular recess (31) are eliminated. The other structure of this embodiment is similar to the embodiment mentioned above.

When the cover (85) is removed, the stop pin (302) of the driving axle (30a) is moved towards the upper sleeve (50a). When the stop pin (302) is positioned in the stop slots (502), the driving axle (30a) is braked.

As described above, the present invention provides a brake device for the transmission device of the food stirrer, so the cutting tool (82) can be quickly stopped as soon as the motor is powered off. Therefore, a user will not be injured by the cutting tool (82), and the food stirrer has a high safety.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A food stirrer comprising:
   a seat having a board, an upper tube extending upwards from the board, a lower tube extending downwards from the board and in communication with the upper tube;
   a driving axle extending through the lower tube and upper tube and having an annular recess defined at a middle portion of the driving axle, a coned portion formed under the annular recess, a seal provided outside the driving axle, a stopping ring with a coned inner wall formed in the seal and corresponding to the coned portion;
   a bushing with a polygonal cross section extending out from the upper tube, and the driving axle extending out from a top end of the bushing;
   an upper sleeve provided between the upper tube and the driving axle;
   a middle sleeve provided beneath the upper sleeve;
   a spring provided in the middle sleeve with a tendency to push the upper sleeve upwards;
   a first one-way ratchet wheel mounted at a bottom end of the driving axle;
   a gear assembly mounted on a bottom end of the driving axle and having a second one-way ratchet wheel engaged with the first one-way ratchet wheel; and
   a container provided on the board, the container having a cover, a pole formed on the cover for pushing the driving axle downwards, and a cutting tool provided outside the bushing and formed with multiple blades.

2. The food stirrer as claimed in claim 1, wherein the driving axle further comprises a magnet ring received in the upper sleeve, and a magnetizable ring provided on the middle sleeve.

3. The food stirrer as claimed in claim 2, wherein the coned portion has an upper diameter smaller than a lower diameter of the coned portion.

4. The food stirrer as claimed in claim 2, wherein the coned inner wall of the stopping ring has an upper diameter smaller than a lower diameter of the coned inner wall.

5. The food stirrer as claimed in claim 1, wherein the driving axle further comprises a magnet ring received in the upper sleeve, and a magnetizable ring provided on the middle sleeve.

6. The food stirrer as claimed in claim 1, wherein the coned portion has an upper diameter smaller than a lower diameter of the coned portion.

7. The food stirrer as claimed in claim 1, wherein the coned inner wall of the stopping ring has an upper diameter smaller than a lower diameter of the coned inner wall.

8. The food stirrer as claimed in claim 1, wherein
the driving axle further has a hole radially defined through the driving axle, and a stop in extending through the hole; and
a stopping ring is provided beneath the upper sleeve, and has an opening for the driving axle extending therethrough, and multiple stop slots radially defined in the stopping ring for positioning the stop pin.

* * * * *